Aug. 4, 1959   J. FERRERA   2,898,145
BAY WINDOW CONSTRUCTION FOR EXPANSIBLE TRAILERS
Filed Aug. 2, 1957   2 Sheets-Sheet 1

INVENTOR.
JOHN FERRERA
BY
ATTORNEYS

Aug. 4, 1959 J. FERRERA 2,898,145
BAY WINDOW CONSTRUCTION FOR EXPANSIBLE TRAILERS
Filed Aug. 2, 1957 2 Sheets-Sheet 2
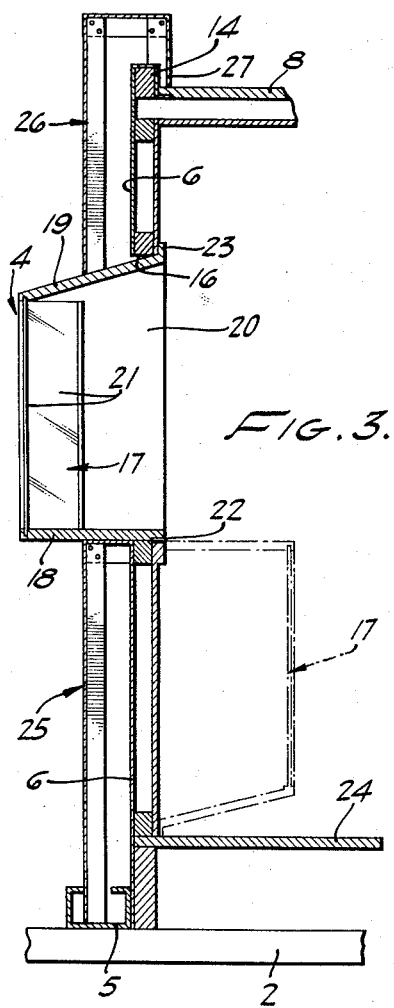
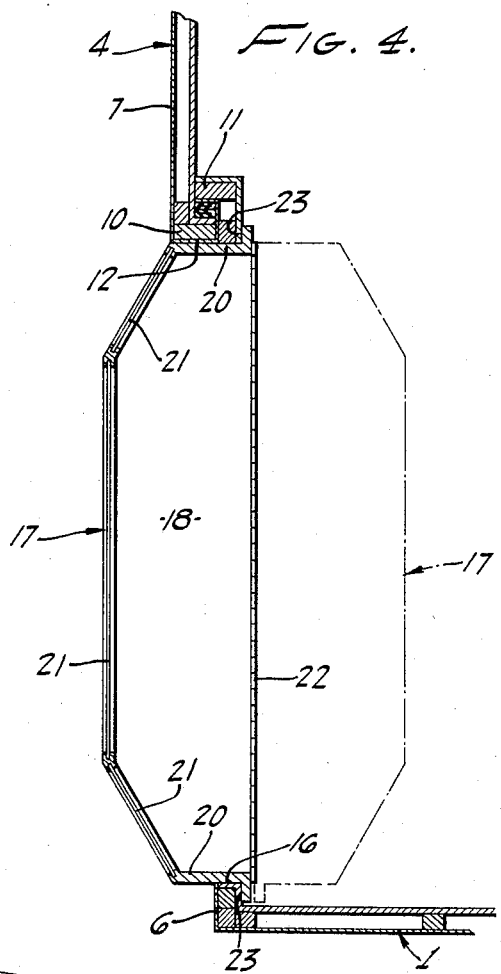
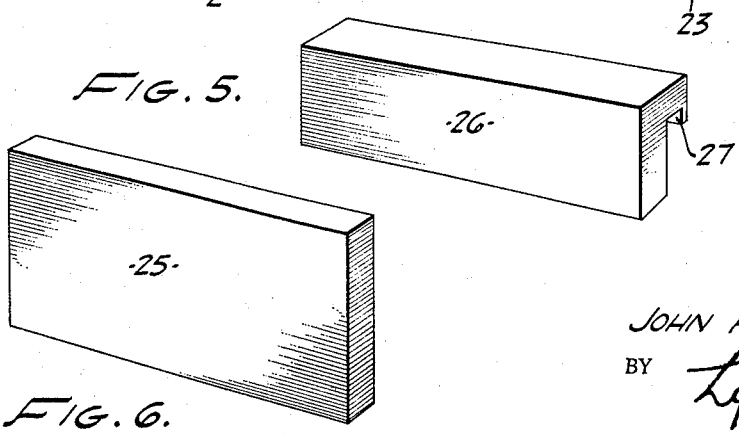
INVENTOR.
JOHN FERRERA
BY
ATTORNEYS United States Patent Office 2,898,145
Patented Aug. 4, 1959

2,898,145
BAY WINDOW CONSTRUCTION FOR EXPANSIBLE TRAILERS

John Ferrera, Los Angeles, Calif.

Application August 2, 1957, Serial No. 675,960

6 Claims. (Cl. 296—23)

This invention relates to bay window construction for expansible trailers, and included in the objects of this invention are:

First, to provide for use in an expansible trailer, wherein one trailer section telescopes over an underlying trailer section, a bay window construction which is particularly suited for use at either or both ends of the underlying trailer section, the bay window construction being arranged to fold into the underlying trailer section to permit telescoping of the trailer sections, and readily unfolded to project outwardly therefrom when the trailer sections are extended.

Second, to provide a bay window construction for expansible trailers, wherein bay window units may be provided for both the overlying and underlying trailer units, the bay window unit for the overlying trailer section being fixed and the bay window unit for the underlying trailer section being foldable.

Third, to provide an expansible trailer of this class wherein either or both ends of the underlying trailer section may be equipped with removable panels complementary to a foldable bay window, whereby the exterior of the underlying trailer section may be brought flush with the exterior of the overlying trailer sections so that externally either or both ends of the expansible trailer may appear as a single unit.

With the above and other objects in view, as may appear hereinafter, reference is directed to the accompanying drawings in which:

Fig. 3 is an enlarged fragmentary sectional view through 3—3 of Fig. 1, showing particularly the displaceable bay window unit and indicating by broken lines the displaced position thereof;

Fig. 4 is a fragmentary sectional view through 4—4 of Fig. 2, showing the displaceable bay window in its operating position by solid lines and in its displaceable position by broken lines;

Figs. 5 and 6 are perspective views of upper and lower false front panels employed in conjunction with the displaceable bay window.

Figure 1:
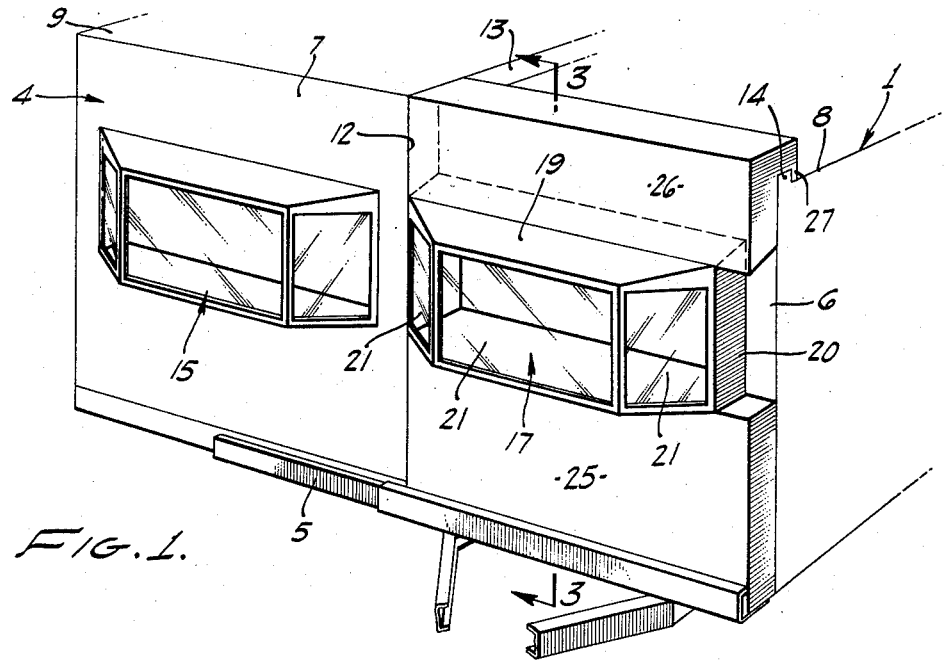
Figure 1 is a fragmentary perspective view showing one end of an expansible trailer incorporating the bay window construction, showing the trailer in its extended position, ready for occupancy.

The bay window construction for expansible trailers herein disclosed is particularly suitable for use in conjunction with the expansible trailer more particularly disclosed in the copending applications, Serial No. 379,932, filed September 14, 1953 for "Expansible House Trailer," and Serial No. 590,292, filed June 8, 1956 for "Extensible Trailer."

The trailer constructions illustrated in said copending applications include an underlying or fixed trailer section 1 mounted on a suitable chassis 2 supported by wheels 3. An overlying or extensible trailer section 4 is arranged to fit over the roof and end walls of the underlying trailer section 1 and is moved between a retracted position and a laterally extended position on telescoping track assemblies 5.

The underlying trailer section 1 is provided with end walls 6, one of which is illustrated in the drawings, and the overlying trailer section 4 is also provided with an end wall 7 capable of overlying the end walls 6 when the trailer sections are retracted. Similarly, the underlying trailer section 1 is provided with an underlying roof 8 and the overlying trailer section 4 is provided with an overlying roof 9. The margins of the end walls and roofs which border the confronting or open sides of the two trailer sections are provided with overlapping flanges 10 and 11, capable of forming a sealed connection when the trailer sections are in their relatively extended position.

By reason of the fact that one trailer section telescopes within the other, there is formed externally of those portions of the overlapping flanges 11 which extend vertically at the ends of the trailer, vertical offsets or shoulders 12. Similarly, a step 13 is formed between the roof portions 8 and 9 of the two trailer sections. The ends of the roof 8 of the underlying trailer section 1 may be provided with upwardly extending ribs or rudimentary parapets 14.

Fitted within one or both end walls 7 of the overlying trailer section 4 is a fixed bay window unit 15. One or both end walls 6 of the underlying trailer section 1 is provided with a bay window opening 16, preferably identical in dimension to the bay window opening in which the fixed bay window unit 15 is mounted.

The bay window opening 16 receives a displaceable bay window unit 17 which includes a sill 18, a roof 19, end walls 20, and suitably arranged window elements 21. The sill 18 is joined to the lower margin of the bay window opening 16 by a hinge 22. The roof 19 is disposed on a slope so that the displaceable bay window 17 may pivot about the axis of the hinge 22 from the solid line position shown in Figs. 3 and 4 to the broken line position shown therein. When the bay window unit 17 is in its solid line position, it protrudes through the bay window opening 16 and may externally appear to be identical to the fixed bay window unit 15.

In order to limit movement of the displaceable bay window 17, the end walls 20 and roof 19 may be provided with a marginal lip 23 which engages the corresponding margins of the opening 16, as shown best in Figs. 3 and 4.

The bay window opening 16 has, preferably, a vertical dimension equal to or less than the distance between its lower margin and the floor 24 of the fixed trailer section 1, so that when the displaceable bay window unit 17 is in its inner or displaceable position it may lie against the inside surface of the trailer wall as shown by broken lines in Fig. 3.

To enhance the appearance of the end of the trailer and to render the fixed and displaceable bay window units 15 and 17 more identical in appearance, the end wall 6 of the underlying or fixed trailer section 1 may receive a bottom panel 25 having a thickness corresponding to the depth of the offset 12, a height corresponding to the distance between the underside of the displaceable bay window 17 and the track at the underside of the fixed trailer section 1, and a width equal to the width of the fixed trailer section. The bottom panel may be formed of light weight sheet metal with suitable internal framework so that the panel may be easily set into position or removed therefrom.

Similarly, a top panel 26 may be provided. The top panel may have a thickness corresponding to the offset 12, a height extending from the displaceable bay window unit 17 to the level of the roof 9 of the extensible trailer section 4, and a width equal to the width of the fixed trailer section 1. The upper rear margin of the top panel may form a longitudinal hook portion 27 which hooks over the parapet 14.

In the construction illustrated, the end walls 6 and 7 of the trailer sections 1 and 4 are shown as vertical or box-like. However, in practice, these walls may be curved or otherwise contoured to impart a pleasing appearance to the trailer. Thus it follows that while for simplicity of illustration the bottom and top panels are shown as substantially rectangular bodies, it is intended that they be contoured to match the contour selected for the end wall 7 of the overlying trailer section 4.

When the trailer sections are in their retracted position, the bay window unit 17 is located in its displaceable position indicated by broken lines in Figs. 3 and 4. The bottom and top panels 25 and 26 may be stored within the fixed trailer section 1 on top of the inverted and displaceable bay window unit 17, or elsewhere within the fixed trailer section.

Figure 2:
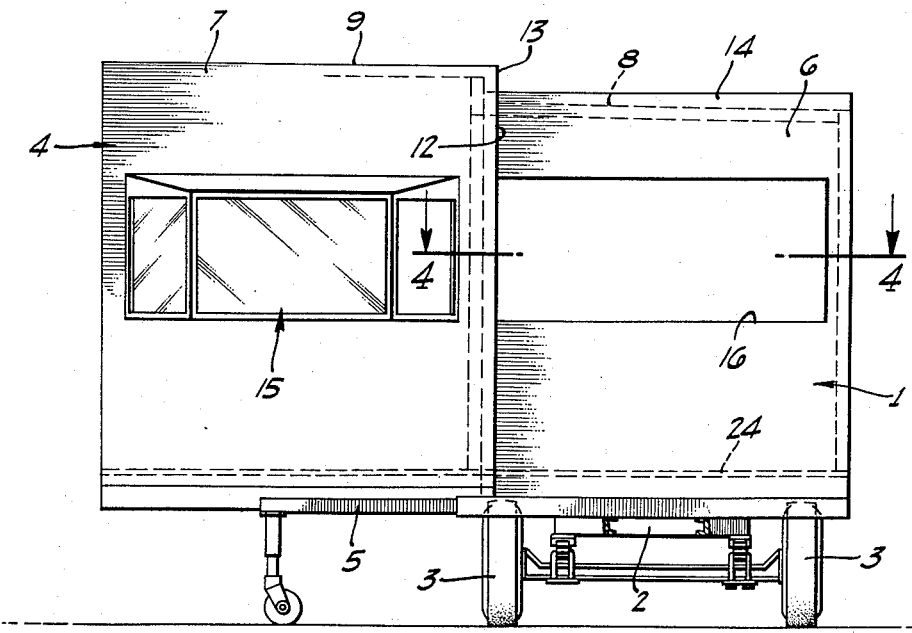
Fig. 2 is an end view of an expansible trailer in its extended position, but arranged so that the trailer sections may be relatively retracted.

After the trailer sections have been extended as shown in Fig. 2, the bay window unit 17 is rotated to its extended position as shown in Fig. 1 and by solid lines in Figs. 3 and 4, and the bottom and top panels 25 and 26 are set in their respective positions. This need require the work of only a few minutes.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. An expansible trailer construction, comprising: a first and a second trailer section, said trailer sections being relatively movable between relatively telescoped and laterally extended positions, and having, respectively, an inner wall and an outer wall movable between an overlapping position when the trailer sections are telescoped, and a laterally displaced position when said trailer sections are extended; said inner wall of the first trailer section defining a window opening therein; a bay window unit hinged to a margin of said window opening and movable between a retracted position within said inner trailer section, to permit telescoping and extension of said trailer sections, and an outwardly projecting position when said trailer sections are extended, and a fixed bay window projecting from said outer wall in lateral alignment with said bay window unit and arranged to cover said window opening of the inner wall when said walls are telescoped.

2. An expansible trailer construction, comprising: a first and a second trailer section, said trailer sections being relatively movable between relatively telescoped and laterally extended positions, and having, respectively, an inner wall and an outer wall movable between an overlapping position when the trailer sections are telescoped, and a laterally displaced position when said trailer sections are extended; said inner wall of the first trailer section defining a window opening therein; a bay window unit including a sill, a roof, end walls, and a windowed wall; hinge means joining said sill to the lower margin of said window opening; said bay window being pivotable about said hinge means between a retracted position at the inner side of said inner wall to an extended position projecting through and beyond the exterior side of said inner wall; and a fixed bay window projecting outwardly from said outer wall and movable when said trailer sections are telescoped to a position overlying said window opening.

3. An expansible trailer construction, comprising: a first and a second trailer section, said trailer sections being relatively movable between relatively telescoped and laterally extended positions, and having, respectively, an inner wall and an outer wall movable between an overlapping position when the trailer sections are telescoped, and a laterally displaced position when said trailer sections are extended; said inner wall of the first trailer section defining a window opening therein; a bay window unit hinged to a margin of said window opening and movable between a retracted position within said inner trailer section, to permit telescoping and extension of said trailer sections, and an outwardly projecting position when said trailer sections are extended; and panel elements complementary to said bay window unit when in its extended position, arranged to form a false surface for said inner wall disposed substantially flush with the exterior of said outer wall.

4. An expansible trailer construction, comprising: a first and a second trailer section, said trailer sections being relatively movable between relatively telescoped and laterally extended positions, and having, respectively, an inner wall and an outer wall movable between an overlapping position when the trailer sections are telescoped, and a laterally displaced position when said trailer sections are extended; said inner wall of the first trailer section defining a window opening therein; a bay window unit including a sill, a roof, end walls, and a windowed wall; hinge means joining said sill to the lower margin of said window opening; said bay window being pivotable about said hinge means between a retracted position at the inner side of said inner wall to an extended position projecting through and beyond the exterior side of said inner wall; and panel elements complementary to said bay window unit when in its extended position, arranged to form a false surface for said inner wall disposed substantially flush with the exterior of said outer wall.

5. An expansible trailer construction, comprising: a first and a second trailer section, said trailer sections being relatively movable between relatively telescoped and laterally extended positions, and having, respectively, an inner wall and an outer wall movable between an overlapping position when the trailer sections are telescoped, and a laterally displaced position when said trailer sections are extended; said inner and outer walls having similar window openings therein; a fixed bay window unit set in the opening in the outer wall; and a retractable bay window unit hinged to a margin of the opening in said inner wall, said retractable bay window movable between a retracted position within said first trailer section, to permit said trailer sections to telescope and extend, and an extended position, when said trailer sections are extended, matching the projecting condition of the fixed bay window.

6. An expansible trailer construction, comprising: a first and a second trailer section, said trailer sections being relatively movable between relatively telescoped and laterally extended positions, and having, respectively, an inner wall and an outer wall movable between an overlapping position when the trailer sections are telescoped, and a laterally displaced position when said trailer sections are extended; said inner and outer walls having similar window openings therein; a fixed bay window unit set in the opening in the outer wall; a retractable bay window unit hinged to a margin of the opening in said inner wall, said retractable bay window movable between a retracted position within said first trailer section, to permit said trailer sections to telescope and extend, and an extended position, when said trailer sections are extended, matching the projecting condition of the fixed bay window; and panel elements complementary to said retractable bay window when said window and said trailer sections are extended, and arranged to form a false surface for said inner wall flush with said outer wall.

References Cited in the file of this patent

UNITED STATES PATENTS

| 1,972,415 | Anderson | Sept. 4, 1934 |
| 2,757,418 | Bergstrom | Aug. 7, 1956 |

FOREIGN PATENTS

| 334,215 | Great Britain | Aug. 29, 1930 |
| 397,982 | Great Britain | Sept. 7, 1933 |